United States Patent [19]
Ofori et al.

[11] Patent Number: 5,981,788
[45] Date of Patent: Nov. 9, 1999

[54] METHOD FOR RECOVERING AND RECYCLING CATALYST CONSTITUENTS

[75] Inventors: John Yaw Ofori, Niskayuna; Sheldon Jay Shafer, Clifton Park; Eric James Pressman, East Greenbush; Ganesh Kailasam, Clifton Park; Julia Lam Lee, Niskayuna, all of N.Y.

[73] Assignee: General Electric Company, Schenectady, N.Y.

[21] Appl. No.: 08/963,109

[22] Filed: Nov. 3, 1997

[51] Int. Cl.[6] ............................. C07C 68/08; C07C 69/96
[52] U.S. Cl. .......................... 558/274; 558/271; 558/272; 558/273
[58] Field of Search ................................................ 558/274

[56] References Cited

U.S. PATENT DOCUMENTS

| | | |
|---|---|---|
| 4,069,169 | 1/1978 | Toyoda et al. . |
| 5,231,210 | 7/1993 | Joyce et al. . |
| 5,284,964 | 2/1994 | Pressman et al. . |
| 5,380,907 | 1/1995 | Mizukami et al. . |
| 5,399,734 | 3/1995 | King, Jr. et al. . |
| 5,498,789 | 3/1996 | Takagi et al. . |
| 5,712,406 | 1/1998 | Buysch et al. ........................... 558/274 |
| 5,821,377 | 10/1998 | Buysch et al. ........................... 558/274 |

*Primary Examiner*—Michael G. Ambrose
*Attorney, Agent, or Firm*—Noreen C. Johnson; Douglas E. Stoner

[57] ABSTRACT

Catalytic materials including divalent palladium compounds, divalent cobalt compounds and bromide sources such as tetraalkylammonium and hexaalkylguanidinium bromides are removed from organic carbonylation reaction mixtures comprising said materials in combination with diaryl carbonate and hydroxyaromatic compound. The removal steps include extraction with an aqueous complexing solution for palladium, extraction with an aqueous non-basic and preferably ionic extractant for cobalt, and extraction with water to remove bromide source. These steps may be combined into an integrated process. Further steps of recycle of the palladium by reduction to elemental palladium and conversion to a catalytically active species, and conversion of cobalt to a catalytically active species, may be included in the integrated process.

39 Claims, 4 Drawing Sheets

METHOD FOR RECOVERING AND RECYCLING CATALYST CONSTITUENTS

BACKGROUND OF THE INVENTION

This invention relates to catalyst recycle, and more particularly to the conversion and recycle of the constituents of catalyst compositions used to conduct chemical reactions.

The use as catalysts of various transition metals is known. Among the catalyst constituents in common use are compounds of the Group VIIIB metals, including those having atomic numbers of at least 44 (i.e., ruthenium, rhodium, palladium, osmium, iridium and platinum), hereinafter "heavy Group VIIIB metals".

Compounds of other transition metals such as cobalt, lead, manganese, cerium and copper are also useful as constituents of catalyst compositions. Those of the Group VIIIB metals having atomic numbers less than 44 (i.e., iron, cobalt and nickel), hereinafter "light Group VIIIB metals", are often especially useful and valuable.

Bromide sources are also frequently present in various catalyst compositions. These include trialkylamine hydrobromides and tetraalkylammonium, tetraalkylphosphonium and hexaalkylguanidinium bromides.

The reactions in which such compounds serve a catalytic function include some which involve organic compounds as reactants, products or both. An illustration is the catalytic carbonylation of hydroxyaromatic compounds such as phenol with carbon monoxide and oxygen to yield diaryl carbonates such as diphenyl carbonate. This reaction will sometimes be designated "carbonylation" hereinafter.

In a typical carbonylation reaction, phenol is combined with a compound of a heavy Group VIIIB metal, most often palladium, and other catalytic species which may include organic and inorganic co-catalysts and at least one bromide source. Light Group VIIIB metal, especially cobalt, compounds are often used as inorganic cocatalysts, and the use of tetraalkylammonium or hexaalkylguanidinium bromides as bromide sources is frequently advantageous. The resulting mixture is pressurized with carbon monoxide and oxygen to yield a product mixture containing diphenyl carbonate, unreacted phenol and by-products which include palladium in elemental and/or combined form and cobalt compounds.

Since transition metals such as palladium and cobalt and bromide sources are expensive, it would be highly desirable to recover them from the product mixture, after which they could be reconverted to catalytically active species capable of employment in further carbonylations.

SUMMARY OF THE INVENTION

It is of interest, therefore, to develop a simple means for recovering heavy and light Group VIIIB metals and halide sources from organic materials and reconvert them in fairly simple fashion to catalytically active compounds. It is of particular interest to develop such a means in which the steps of recovery of the various catalyst components can be integrated. The present invention provides a method for such recovery and conversion.

One aspect of the invention is a method for removal of catalytic materials from an organic material having limited solubility in water and comprising a first metal which is a Group VIIIB metal having an atomic number of at least 44, a second metal which is a transition metal and a bromide source, which method comprises at least one of the following:

(A) removing said first metal by extraction with an aqueous solution comprising (1) ions capable of forming a stable complex with said metal and (2) at least one strong inorganic acid, thereby forming a complex of said first metal;

(B) removing said second metal by extraction with a non-basic aqueous extractant; and (C) removing tetraalkylammonium or hexaalkylguanidinium bromide used as a bromide source by extraction with water.

Other aspects of the invention further comprise steps of separation of the complexes thus obtained from other catalytic metals or their compounds and conversion of said complexes to catalytically active species. Such conversion may be achieved by such varied means as direct chemical reactions or reduction to elemental metal followed by oxidation to active compounds.

DETAILED DESCRIPTION; PREFERRED EMBODIMENTS

Figure 1:
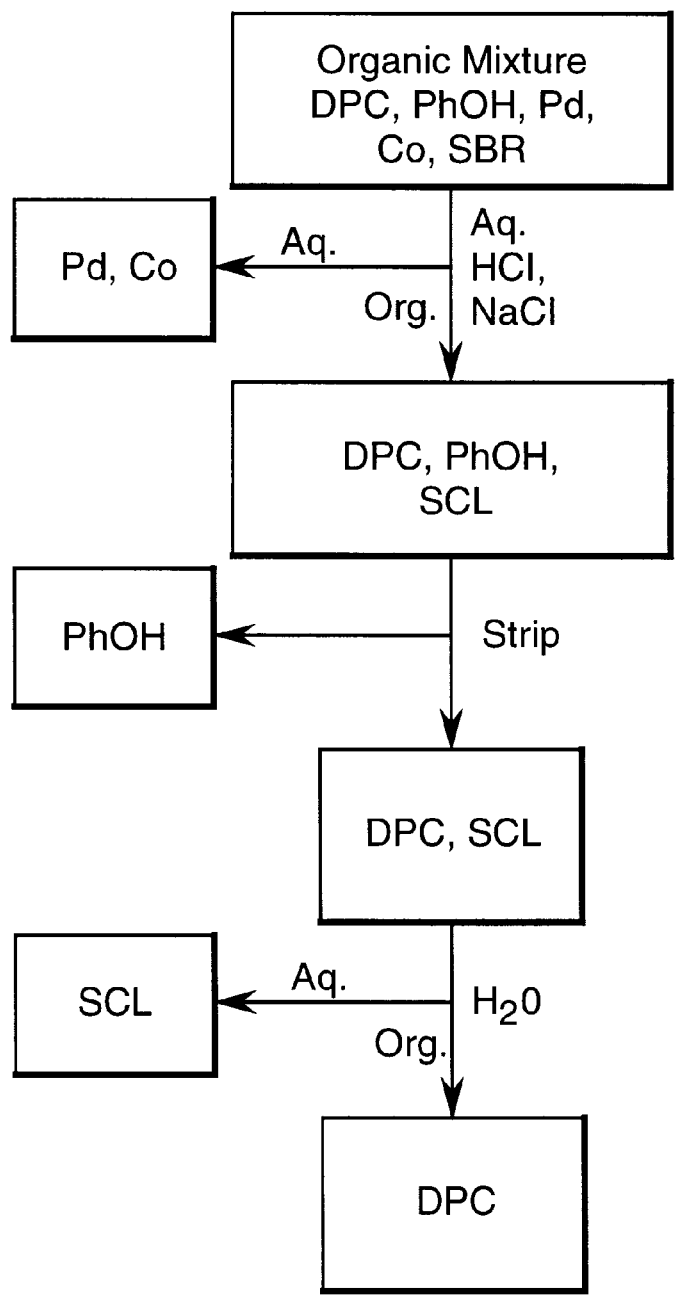
FIGS. 1–3 are flow charts of illustrative integrated processes according to the invention, for recycle of palladium, cobalt and bromide source catalyst constituents.

Three separation steps are features of the method of this invention. They may be employed separately or in combinations which may include two or all three of said steps. When employed in combination, they may be performed in various orders as exemplified hereinafter. Thus, the letter designations of the separation steps are not intended to prescribe an invariable order in which those steps are performed.

The method of the invention is considered particularly applicable to carbonylation reaction mixtures comprising at least one diaryl carbonate, at least one hydroxyaromatic compound and catalyst constituents including a heavy Group VIIIB metal compound, co-catalysts (usually inorganic and organic, the inorganic co-catalyst being at least one transition metal compound) and a bromide source, and it will be described hereinafter solely in terms of such reactions. The product, a diaryl carbonate such as diphenyl carbonate, is essentially water-immiscible and thus does not migrate in appreciable amounts to the aqueous extractants employed as described hereinafter. Unreacted hydroxyaromatic compound, such as phenol, may also be present. It is considerably more soluble in water than is diaryl carbonate, and consequently its migration to the aqueous phase is preferably minimized in certain stages by the employment of highly ionic aqueous solutions, also as described hereinafter.

By reason of the particular suitability of palladium and cobalt, their compounds are frequently preferred as carbonylation catalyst constituents and the general description of the invention will therefore center on palladium and cobalt compounds. It should be understood, however, that the method of the invention may be applied equally well to any reaction affording as product an organic material having low solubility in water and employing a catalyst comprising any heavy Group VIIIB metal compounds and other catalytically active transition metal compounds.

Typical palladium compounds which are employed as carbonylation catalysts are the salts of divalent palladium with carboxylic acids such as acetic acid and P-diketones such as 2,4-pentanedione (acetylacetone). Typical cobalt compounds include simple cobalt salts such as cobalt(II) acetate and cobalt(II) chloride, and cobalt complexes such as cobalt(II) 2,4-pentanedionate and the cobalt(II5) complex of bis[3-(salicylalamino)propyl]methylamine, said complex hereinafter being designated "CoSMDPT". Bromide sources include tetraalkylammonium and hexaalkylguanidinium bromides; illustrative are tetramethylammonium bromide, tetra-n-butylammonium bromide and hexaethylguanidinium bromide. Suitable organic cocatalysts include various terpyridine, phenanthroline, quinoline and isoquinoline compounds, with 2,2':6',2"-terpyridine often being preferred. These compounds and the by-products formed therefrom are generally incorporated in the organic phase during carbonylation.

The major product of the carbonylation reaction is usually a substantially homogeneous organic liquid containing diaryl carbonate (typically diphenyl carbonate); excess hydroxyaromatic compound (typically phenol); and palladium compounds, inorganic co-catalytic compounds or their by-products and bromide sources or their by-products. Also present may be organic co-catalysts such as terpyridines, or their by-products.

Step A of the method of the invention is the removal of elemental and combined palladium from the organic liquid by extraction with an aqueous solution. The extraction solution used in this step comprises at least one strong inorganic acid as illustrated by hydrochloric, hydrobromic, nitric and sulfuric acids, in combination with ions capable of forming a stable complex with palladium. The preferred ions of this type are halide ions, which form such complexes as tetrahalopalladate. Bromide and chloride ions are preferred, with chloride ions being especially preferred. During this step, it is believed that elemental palladium is oxidized to the divalent state.

A particularly suitable aqueous solution is a dilute hydrochloric acid solution, since it is strongly acidic and also contains the necessary complexing anions. The concentration of the aqueous hydrochloric acid solution is most often in the range of about: 1–35% by weight.

Extraction with the aqueous solution is typically performed at a temperature in the range of about 20–100° and preferably about 50–100° C. It may be performed in a single step, in multiple steps or continuously. Continuous (e.g., countercurrent) or multiple step extractions are often preferred to ensure removal of substantially all of the palladium.

By reason of the substantial insolubility of the organic material in the ionic aqueous phase, it is a simple matter to separate the aqueous ionic palladium-containing solution from organic materials. When the method of the invention is employed, cobalt in the divalent and/or trivalent state is generally extracted into the aqueous phase in combination with the palladium unless it has been removed earlier as described hereinafter.

Step B of the method of the invention is the removal of cobalt, also by extraction. The nature of the aqueous extractant used therefor is not critical, provided it is non-basic since diaryl carbonate is rapidly hydrolyzed upon contact with a basic aqueous medium. Thus, cobalt will be removed concurrently with palladium if step A precedes step B.

The extractant employed in step B is preferably a non-basic aqueous solution of an ionic compound. Suitable ionic compounds include amino acids and inorganic acids which form complexes with divalent cobalt, and their salts, typically containing metal and preferably alkali metal cations such as sodium or potassium. Examples of suitable amino acids are glycine, alanine, β-alanine, iminodiacetic acid and nitrilotriacetic acid. Examples of suitable inorganic acids are hydrochloric, hydrobromic and sulfuric acids. The chlorides, and especially hydrochloric acid, sodium chloride and combinations thereof, are generally preferred.

The proportion of ionic material present in the extractant for step B is generally in the range of about 1–35% by weight. Extraction may take place at a temperature in the range of about 20–100° and preferably about 50–100° C. As in step A, a single extraction or multiple or continuous extractions may be performed.

Step C is the removal of bromide source from the organic reaction mixture, and it is achieved by simple extraction with water. The use of water rather than an ionic solution is beneficial since the solubility of bromide sources in ionic aqueous solutions is much less than in water, to the point where extraction may not be optimally effective if an ionic solution is employed.

The presence of large amounts of phenol in the organic mixture being extracted may be disadvantageous. In the first place, phenol may make difficult the removal of the bromide source or its chloride analog. In the second place, phenol concentrations above about 40% by weight can cause poor aqueous-organic phase separation and concentrations above about 20% can result in relatively large amounts of phenol being extracted into the aqueous phase. It is frequently preferred, therefore, to remove a substantial proportion of phenol from the carbonylation mixture prior to step C, typically by vacuum stripping, to produce an organic phase typically containing up to 20% phenol.

Depending on the identity of the bromide source, it may also be preferred to precede step C with hydrochloric acid treatment, for example step A, so as to convert the bromide to chloride. This is true, for example, of relatively hydrophobic tetraalkylammonium bromides such as tetra-n-butylammonium bromide, since the corresponding chloride is substantially more soluble in water than the bromide. It is frequently found that hydrochloric acid treatment before the removal of phenol results in optimization of removal of bromide source or the corresponding chloride.

Extraction in step C may also be single, multiple or continuous. It is typically conducted at a temperature in the range of about 20–100° and preferably about 50–100° C.

Among the useful embodiments of the present invention are processes in which palladium, cobalt and halide source are all removed from an organic reaction mixture in an integrated series of operations. Those skilled in the art will recognize that the nature of the integrated process depends to some extent on the identities of the materials to be removed and recycled, as well as on the extractants employed and the order of their employment.

For example, it is generally not preferred to employ water alone in step B since a substantial proportion of bromide source, and possibly also unreacted hydroxyaromatic compound, may be extracted at the same time to form a mixture which will require one or more further separation steps. Also, the use of an initial extractant which includes complex-forming ions such as chloride and a strong inorganic acid such as hydrochloric acid will cause simultaneous extraction of palladium and cobalt, which may then be separated by reduction of the palladium from solution or by ashing followed by separation as described hereinafter.

FIG. 1 is a flow chart of an illustrative integrated embodiment of the invention, in which steps A, B and C are combined and a single extraction employed for both of steps A and B. As shown therein, an organic carbonylation reaction mixture comprising diphenyl carbonate (DPC), phenol (PhOH), elemental and combined palladium (Pd), combined cobalt (Co) and bromide source (SBR) is first treated with an aqueous solution of hydrochloric acid and sodium chloride, whereupon combined palladium and cobalt are extracted into the aqueous phase. The resulting first extracted organic mixture, now comprising diphenyl carbonate, phenol and chloride equivalent (SCL) of the bromide source (hereinafter "converted bromide source"), is then subjected to vacuum stripping to remove a major proportion of the phenol and yield a second extracted organic mixture comprising diphenyl carbonate and converted bromide source. Finally, the second extracted organic mixture is extracted with water to remove the converted bromide source, leaving diphenyl carbonate of enhanced purity as the organic phase.

Figure 2:
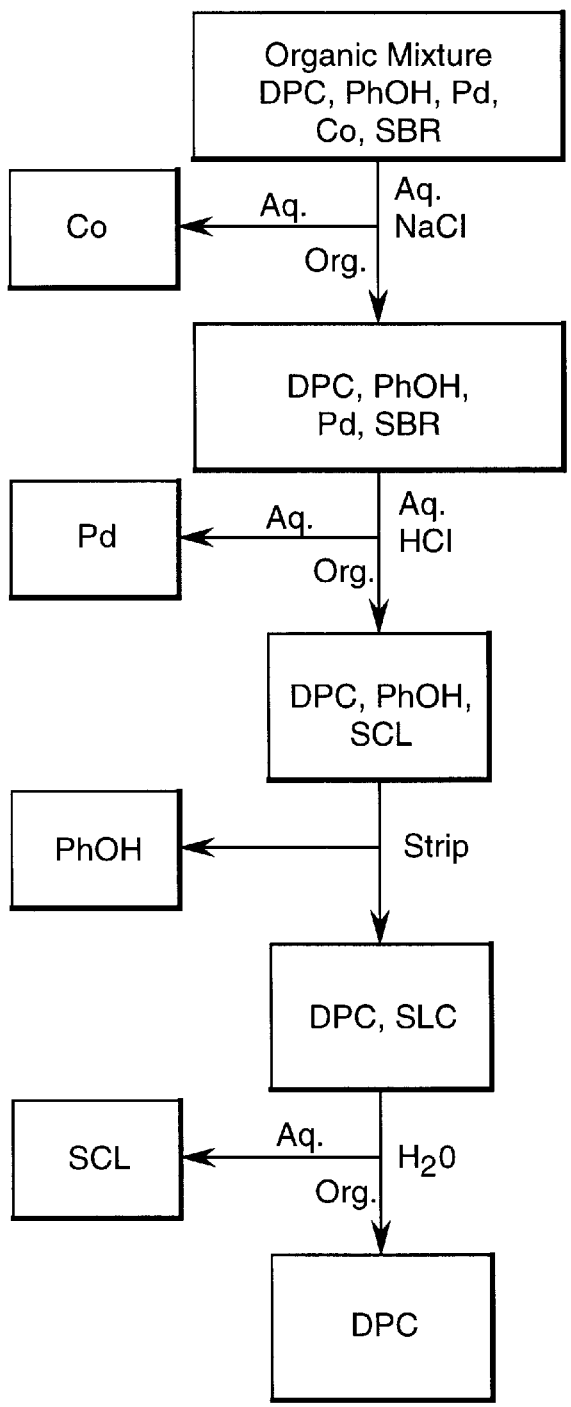

In a second integrated embodiment, shown in FIG. 2, the first step is extraction of the organic mixture with aqueous sodium chloride solution to remove divalent cobalt. The resulting first extracted organic mixture is then further extracted with an aqueous solution of hydrochloric acid to remove divalent palladium, leaving a second extracted organic mixture containing diphenyl carbonate, phenol and converted bromide source. This residue is then subjected to the same concluding steps as in FIG. 1 to yield a third extracted organic mixture and, finally, diphenyl carbonate of enhanced purity.

Figure 3:
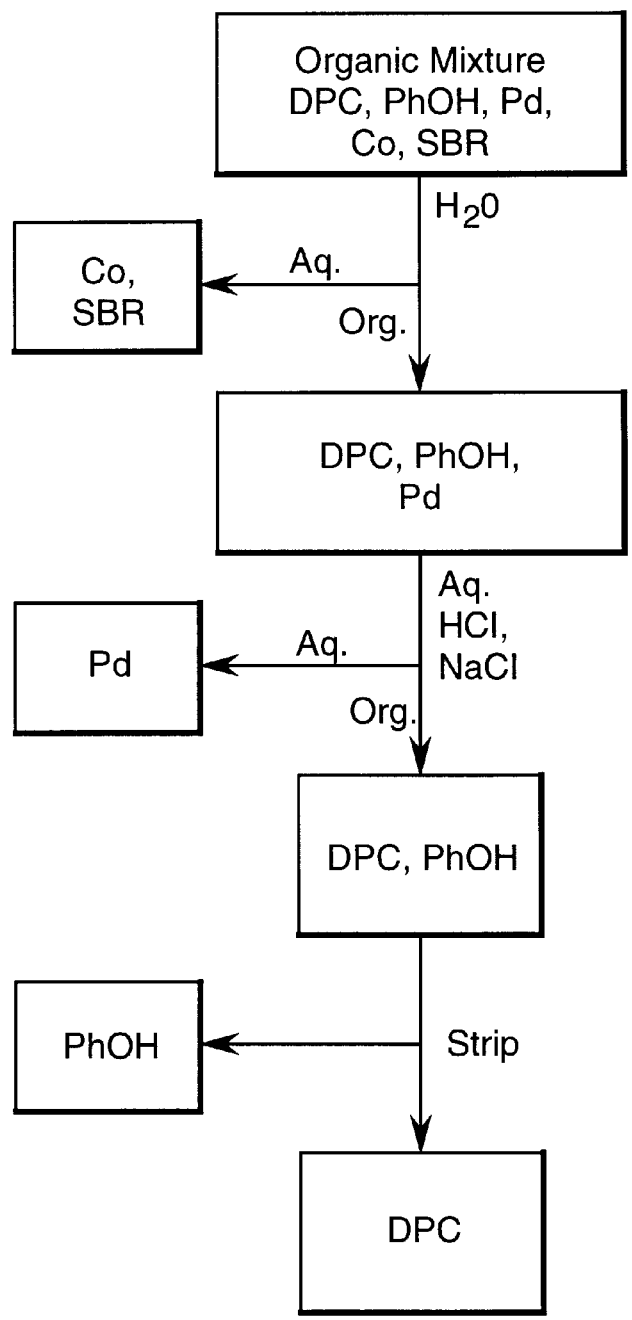

FIG. 3 depicts still another integrated embodiment in which the first step is extraction with water to remove combined cobalt and bromide source, which may then be separated by precipitation of a water-insoluble cobalt(ll) salt such as the 2,4-pentanedioate. The first extracted organic mixture resulting from the extraction is further extracted with aqueous hydrochloric acid to remove elemental and combined palladium, yielding a second extracted organic mixture from which phenol is stripped to leave diphenyl carbonate of enhanced purity.

In preferred embodiments, the invention includes steps of recovery of catalyst constituents for recycle. The palladium may be recovered by reduction to elemental palladium, reoxidation to the divalent state and conversion to a catalytically active species. Cobalt, if present with the palladium, generally remains for the most part in combined form, either divalent or trivalent.

Reduction to elemental palladium may be accomplished by treatment with a suitable reducing agent, examples of which are formic acid, elemental hydrogen, hydrazine and sodium borohydride. Formic acid, employed in aqueous solution, and elemental hydrogen are preferred by reason of their effectiveness and relative environmental harmlessness.

Figure 4:
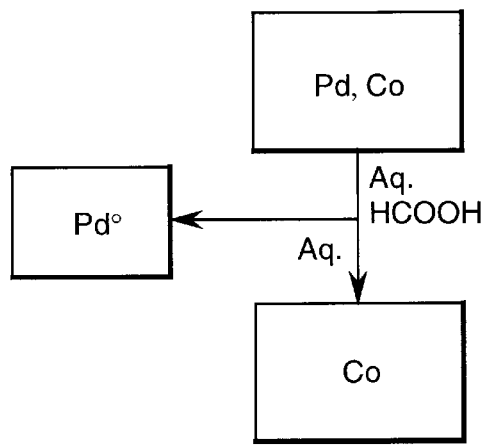
FIGS. 4–5 are flow charts of portions of the process related to separation of palladium from cobalt.

Said reduction may be performed in aqueous solution, whereupon the elemental palladium precipitates and leaves in solution any cobalt also present. FIG. 4 depicts one example of this option. It comprises a single step of treatment with aqueous formic acid solution, whereupon the palladium is reduced to the elemental state ($Pd_0$) and may be separated by filtration to leave an aqueous solution of divalent cobalt.

Figure 5:
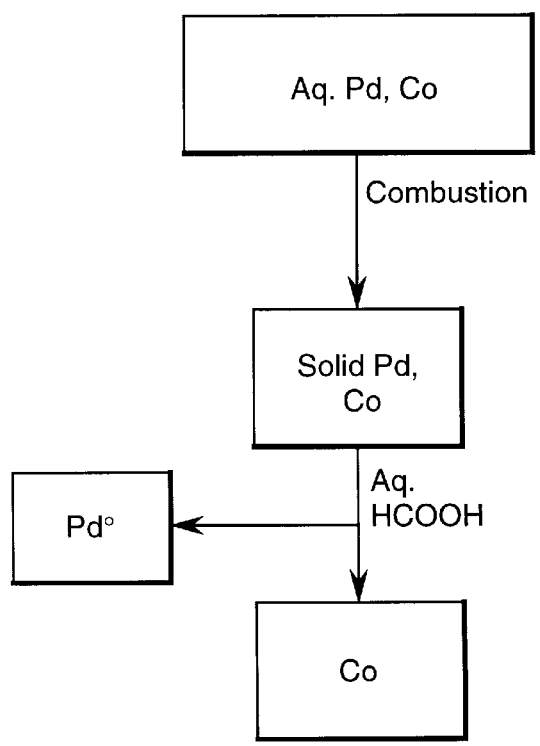

It is frequently advantageous, however, to convert palladium- and cobalt-containing materials to solids prior to reduction. This may be achieved as shown in FIG. 5, by evaporating the liquid, chiefly water, and combusting the residue at elevated temperature, typically in the range of about 300–500° C., and under mildly oxidizing conditions, e.g., in the presence of air, to remove organic residues. The product of this series of steps is a solid comprising elemental and combined palladium and divalent or trivalent cobalt compounds. This solid is then treated with aqueous formic acid solution to reduce the palladium to the elemental state and leave cobalt(II) salts in solution.

More complete separation of palladium from cobalt may be accomplished by oxidizing the solid palladium to produce an aqueous divalent palladium solution, using an oxidizing agent such as nitric acid, bromine, sodium chlorate or hydrogen peroxide, with nitric acid often being preferred, especially in contact with hydrochloric or acetic acid. treatment. Most often, a mixture of glacial acetic acid and concentrated (about 68% by weight) nitric acid is employed in a volume ratio of about 20–50:1. At temperatures in the range of about 50–120° C., the elemental palladium readily dissolves to form palladium(II) acetate.

The resulting combined palladium can then again be reduced as described above to produce a second crop of solids consisting essentially of elemental palladium, with cobalt remaining in solution. The elemental palladium may be separated and reoxidized to divalent palladium, which may be recovered by conventional means; if the palladium compound is palladium(II) acetate, it is ready for recycle as a catalyst constituent.

In another embodiment of the invention, the palladium salt is converted to a salt of at least one aliphatic β-diketone. By "β-diketone" is meant a compound containing two keto carbonyl groups separated by a single carbon atom, usually, but not necessarily, in the form of a $CH_2$ linkage.

Suitable β-diketones include 2,4-pentanedione, 2,4-hexanedione and 3,5-heptanedione. 2,4-Pentanedione is generally preferred because of its availability, relatively low cost and particular suitability. The proportion thereof employed should be at least an equivalent proportion (i.e., 2 moles per mole of divalent palladium) and preferably an excess, typically of up to about 50%.

The palladium salt of the β-diketone may be prepared by simple reaction and isolated by conventional means including such operations as filtration. It may then be dissolved in an organic compound, e.g., phenol, to produce a solution with especially high catalytic activity.

Reconversion of cobalt to a catalytic species is usually fairly easy, since a major proportion of the cobalt, usually essentially all thereof, remains in the combined state in the form of a compound having substantial catalytic activity. If desired, it may be converted to a compound having even greater catalytic activity, such as CoSMDPT. This may be done by simply contacting an aqueous or alcoholic solution of the cobalt with the ligand.

The bromide source is generally recovered either in its original form, in which it is catalytically active and may be recycled for use in further carbonylation reactions without further treatment, or as the chloride which may be easily reconverted to the bromide by ion exchange.

The method of this invention is illustrated by the following examples. All parts and percentages are by weight unless otherwise indicated. Carbonylation reaction mixtures contained, unless otherwise specified, diphenyl carbonate, phenol, palladium- and cobalt-containing catalytic compounds, 2,2':6',2"-terpyridine as organic co-catalyst and hexaethylguanidinium bromide as halide source, although the proportions of all may not be specified in each example.

Example 1

A 1,530-g sample of carbonylation reaction mixture containing 676 mg palladium was heated to 85° C. and extracted twice with 9% aqueous hydrochloric acid solution. The combined extracts were found to contain 468 mg of palladium.

The extracts were boiled to dryness and ashed in air at 500° C. to yield 1.226 g of ash. A 426.4-mg portion of the ash was contacted with 10 g of a 1:1 (by weight) mixture of water and formic acid at 90° C. for 6 hours, thus reducing the palladium to the elemental state. The resulting liquid, containing most of the cobalt, was decanted.

The remaining solid was contacted with an aqueous solution of 9% hydrochloric and 10% nitric acid and the combination was warmed slowly to 80° C., whereupon the solid dissolved. The solution was evaporated to dryness and the solid was dissolved in water at 80° C. Formic acid, 2 g, was added, whereupon reduction of the palladium to the elemental state again occurred.

The deposited elemental palladium (134.2 mg) was dried under nitrogen and contacted at 80° C. with a mixture of 3.5 ml of acetic acid and 0.1 ml of nitric acid, whereupon it dissolved to form a brown liquid. The liquid was evaporated to dryness, producing palladium(II) acetate as a brown solid which was dissolved in 5 g of acetone. 2,4-Pentanedione, 1 g, was added and the acetone was evaporated to yield 348 mg of palladium(II) 2,4-pentanedionate as a catalytically active yellow-orange solid. It was found by analysis to contain 33.28% palladium (theoretical value 34.92%).

A second portion (554.5 mg) of the ash was similarly treated with aqueous formic acid, hydrochloric/nitric acids arid formic acid. The deposited elemental palladium was found to weigh 178.3 mg. It was treated at 90° C. with a mixture of 4.5 ml of acetic acid and about 0.1 ml of nitric acid, whereupon it dissolved. The solution was evaporated to dryness and the residual palladium(II) acetate was similarly dissolved in acetone and treated with 2,4-pentanedione. A precipitate formed and was separated and dried; it weighed 103 mg and was found to contain 32.74% palladium as palladium(II) 2,4-pentanedionate. The acetone was removed from the liquid phase and the remaining solid (312.5 mg) was found to contain 35.57% palladium. Total recycle efficiency in the two recovery steps was 48%.

Example 2

The carbonylation reaction mixture contained 449 ppm of palladium, 292 ppm of cobalt, 32.3% diphenyl carbonate and 57.6% phenol. A 12.6-g sample thereof was extracted for 30 minutes at 90° C. with 8.2 g of 9% aqueous hydrochloric acid solution. After the extraction, the aqueous phase was found to contain 2.8% phenol. The organic phase contained 174 ppm of palladium, 19.69 ppm of cobalt, 31.5% diphenyl carbonate and 53.9% phenol.

Example 3

The carbonylation reaction mixture was free from 2,2':6', 2"-terpyridine and contained 341 ppm of palladium and 325 ppm of cobalt. A 34-g sample thereof was extracted for 30 minutes at 90° C. with 23.7 g of 15% aqueous hydrochloric acid solution. After the extraction, the organic phase contained 5.72 ppm of palladium and less than 4 ppm of cobalt.

Example 4

The carbonylation reaction mixture contained 140 ppm of cobalt, 24% diphenyl carbonate and 70% phenol. A 10-g sample thereof was extracted twice over 2 hours, at 90° C., with 14 g of a 14% aqueous solution of trisodium nitrilotriacetate. After extraction, the organic phase contained 3 ppm of cobalt.

Example 5

A further 10-g sample of the carbonylation reaction mixture employed in Example 4 was extracted for two hours at 90° C. with 11.16 g of a 10.4% aqueous solution of disodium iminodiacetate. After extraction, the organic phase contained 5 ppm of cobalt.

Example 6

The carbonylation reaction mixture contained 159 ppm of cobalt, 31.5% diphenyl carbonate and 61.3% phenol. A 10-g sample thereof was extracted for 2 hours at 90° C. with 10.56 g of a 5.3% aqueous glycine solution. After extraction, the organic phase contained 20 ppm of cobalt.

Example 7

The carbonylation reaction mixture contained 141 ppm of cobalt, 32.6% diphenyl carbonate and 61.2% phenol. A 10-g sample thereof was extracted for 3 hours at 90° C. with 10 g of a 10% aqueous sodium chloride solution. After extraction, the organic phase contained 27 ppm of cobalt.

Example 8

The carbonylation reaction mixture contained 158 ppm of cobalt and 36% of diphenyl carbonate. A 10-g sample thereof was extracted for 3 hours at 90° C. with 10 g of a 10% aqueous β-alanine solution. After extraction, the organic phase contained 35 ppm of cobalt.

Example 9

The carbonylation reaction mixture contained 141 ppm of cobalt, 17.5% diphenyl carbonate and 77.7% phenol. A 10-g sample thereof was shaken for 2 minutes at 90° C. with 16.7 g of a 9% aqueous hydrochloric acid solution, after which the phase were allowed to settle for 2 minutes. After extraction, the organic phase contained less than 5 ppm of cobalt.

Example 10

The carbonylation reaction mixture contained 28.2% diphenyl carbonate, 68.2% phenol, 286 ppm of cobalt and tetra-n-butylammonium bromide as a bromide source. A 12.4-g sample thereof was extracted for 10 minutes at 90° C. with 12.4 g of water. The aqueous phase after extraction contained 6.75% phenol. The organic phase after extraction contained 13 ppm of cobalt.

Example 11

An 11.4-g sample of the carbonylation reaction mixture of Example 10 was extracted for 10 minutes at 90° C. with 12.4 (g of a 10% aqueous glycine solution. After extraction, the aqueous phase contained 4.83% phenol.

Example 12

The carbonylation reaction mixture contained 25.1% diphenyl carbonate and 69.2% phenol. An 11.2-g sample thereof was extracted for 10 minutes at 90° C. with 11.2 g of an aqueous solution containing 3% hydrochloric acid and 10% sodium chloride. The aqueous phase after extraction contained 2.96% phenol. An extraction with water under similar conditions produced an aqueous phase containing 8.72% phenol.

Example 13

A carbonylation reaction mixture was concentrated by evaporation of phenol to an organic phase containing 70% diphenyl carbonate and 18% phenol. A 29.3-g sample thereof was extracted repeatedly at room temperature with 15 g of water and analyzed for hexaethylguanidinium bromide content initially and after each extraction. The results are given in Table I.

TABLE I

| Extractions | Guanidinium salt content, % |
|---|---|
| 0 | 4.08 |
| 4 | 1.14 |
| 6 | 0.68 |
| 8 | 0.57 |
| 10 | 0.55 |

Example 14

The carbonylation reaction mixture of Example 13 was extracted twice at room temperature with 9% aqueous hydrochloric acid solution to remove palladium and cobalt. It was then extracted repeatedly with water as in Example 13. The results are listed in Table II.

TABLE II

| Extractions | Guanidinium salt content, % |
|---|---|
| 0 | 4.08 |
| 1 | 1.99 |
| 3 | 0.19 |
| 5 | 0.10 |

Example 15

A carbonylation reaction mixture similar to that of Example 13, but containing tetra-n-butylammonium bromide as the bromide source, was concentrated to a content of 67.1% diphenyl carbonate and 2.8% phenol and extracted 3 times with approximately equal volumes of 9% aqueous hydrochloric acid solution. It was then extracted 7 times with approximately equal volumes of water and analyzed for tetraalkylammonium bromide content initially and after each extraction. The results are given in Table III.

TABLE III

| Extractions | Quaternary salt content, % |
|---|---|
| 0 | 3.47 |
| 1 | 3.24 |
| 3 | 2.22 |
| 5 | 1.75 |
| 7 | 1.18 |

Example 16

A carbonylation reaction mixture similar to that of Example 1, containing tetra-n-butylammonium bromide as the bromide source, was extracted with hydrochloric acid solution and concentrated to remove phenol as described in previous examples. It was then extracted repeatedly with water, using various volume ratios of water to organic phase. The results are given in Table IV.

TABLE IV

| Extractions | Water/organic ratio | Quaternary salt content, % |
|---|---|---|
| 0 | — | 7.61 |
| 1 | 1:1 | 7.28 |
| 2 | 1:1 | 6.37 |
| 3 | 1:1 | 4.45 |
| 4 | 4:1 | 2.47 |
| 5 | 4:1 | 0.56 |
| 6 | 5:1 | 0.34 |

Examples 17–18

Carbonylation reaction mixtures containing about 66% diphenyl carbonate, about 30% phenol and tetramethylammonium and tetraethylalammonium bromide (2.83% and 4.23%, respectively) were extracted once with water at a 1:2 volume ratio of water to organic phase. The respective organic mixtures after extraction contained 0.18% 1.76% quaternary ammonium bromide respectively, for extraction efficiencies of 93.6% and 58.4% respectively.

Summarizing the examples, Examples 1–3 show the effectiveness of steps A and B to remove palladium and cobalt from a carbonylation mixture, with Example 1 further demonstrating the conversion of palladium to the active catalytic species palladium(II) 2,4-pentanedionate. Examples 4–10 furnish additional evidence of the effectiveness of step B. A comparison of Examples 10 and 11, as well as Example 12, reveals the improvement provided by the use of an ionic solution rather than water to suppress extraction of phenol into the aqueous phase.

Examples 13–18 demonstrate the effectiveness of step C. In particular, Examples 13–14 show the effectiveness of multiple water washes to remove hexaalkylguanidinium bromide, Examples 15–16 provide similar showings about the removal of tetra-n-butylarnmonium chloride, and Examples 17–18 show the higher efficiency of bromide removal with shorter alkyl chains in the quaternary bromides.

What is claimed is:

1. A method for removal of catalytic materials from an organic material having limited solubility in water and comprising a first metal which is a Group VIIIB metal having an atomic number of at least 44, a second metal which is a transition metal and a bromide source, which method comprises at least one of the following:

(A) removing said first metal by extraction with an aqueous solution comprising (1) ions capable of forming a stable complex with said metal and (2) at least one strong inorganic acid, thereby forming a complex of said first metal;

(B) removing said second metal by extraction with a non-basic aqueous extractant; and (C) removing tetraalkylammonium or hexaalkylguanidinium bromide used as a bromide source by extraction with water.

2. A method according to claim 1 wherein the organic material is a carbonylation reaction mixture comprising at least one diaryl carbonate, at least one hydroxyaromatic compound and catalyst constituents including a heavy Group VIIIB metal compound and, as an inorganic cocatalyst, at least one transition metal compound.

3. A method according to claim 2 wherein the first metal is palladium and the second metal is cobalt.

4. A method according to claim 3 comprising step A.

5. A method according to claim 4 wherein the complex-forming ions are halide ions.

6. A method according to claim 5 wherein the aqueous solution is a hydrochloric acid solution.

7. A method according to claim 3 comprising step B.

8. A method according to claim 7 wherein the extractant is an aqueous solution of an ionic compound.

9. A method according to claim 8 wherein the extractant is a solution of an amino acid or salt thereof.

10. A method according to claim 8 wherein the extractant is a solution of an inorganic acid or salt thereof.

11. A method according to claim 10 wherein the extractant is hydrochloric acid, sodium chloride or a combination thereof.

12. A method according to claim 3 comprising step C.

13. A method according to claim 12 wherein the bromide source is a hexaalkylguanidinium bromide.

14. A method according to claim 12 wherein the bromide source is a tetraalkylammonium bromide.

15. An integrated method for removal of palladium, cobalt and bromide source from a carbonylation reaction mixture comprising diphenyl carbonate, phenol and catalyst constituents including a palladium compound, a cobalt compound and said bromide source comprising a tetraalkylammonium or hexaalkylguanidinium bromide, which comprises:

removing combined palladium and combined cobalt from said reaction mixture by extraction at a temperature in the range of about 20–100° C. with an aqueous solution of hydrochloric acid and sodium chloride to convert said bromide source to a corresponding chloride compound and form an aqueous solution comprising divalent palladium and divalent cobalt and a first extracted organic mixture comprising diphenyl carbonate, phenol and the chloride analog of said bromide source;

stripping phenol from said first extracted organic mixture to form a second extracted organic mixture comprising diphenyl carbonate and said chloride compound; and removing said chloride compound from said second extracted organic mixture by extraction with water at a temperature in the range of about 20–100° C. to yield diphenyl carbonate of enhanced purity.

16. A method according to claim 15 wherein the aqueous solution comprising divalent palladium and divalent cobalt is treated with a reducing agent to reduce the divalent palladium to elemental palladium.

17. A method according to claim 16 wherein the reducing agent is formic acid.

18. A method according to claim 16 wherein the elemental palladium is oxidized to divalent palladium.

19. A method according to claim 18 wherein the oxidation is by a mixture of nitric acid and acetic acid.

20. A method according to claim 15 further comprising the steps of:

evaporating liquid from the aqueous solution of divalent palladium and divalent cobalt, combusting the resulting residue at elevated temperature under mildly oxidizing conditions and treating the resulting solid with a reducing agent to reduce the divalent palladium to elemental palladium.

21. A method according to claim 20 wherein the reducing agent is formic acid or elemental hydrogen.

22. A method according to claim 20 wherein the elemental palladium is oxidized to divalent palladium.

23. A method according to claim 22 wherein the oxidation is by a mixture of nitric acid and acetic acid.

24. A method according to claim 22 wherein the divalent palladium is converted to a catalytically active species.

25. A method according to claim 20 wherein the divalent cobalt is separated and converted to a catalytically active species.

26. An integrated method for removal of palladium, cobalt and bromide source comprising a tetraalkylammonium or hexaalkylguanidinium halide from a carbonylation reaction mixture comprising diphenyl carbonate, phenol and catalyst constituents including a palladium compound, a cobalt compound and said bromide source comprising a tetraalkylammonium or hexaalkylguanidinium bromide, which comprises:

removing combined cobalt from said carbonylation reaction mixture by extraction at a temperature in the range of about 20–100° C. with an aqueous sodium chloride solution to form an aqueous solution of divalent cobalt and a first extracted organic mixture comprising diphenyl carbonate, phenol and said bromide source or its chloride analog;

extracting said first extracted organic mixture with an aqueous hydrochloric acid solution at a temperature in the range of about 20–100° C. to remove palladium, convert said bromide source to a corresponding chloride compound and form an aqueous solution of divalent palladium and a second extracted organic mixture comprising diphenyl carbonate and the chloride analog of said bromide source;

stripping phenol from said second extracted organic mixture to form a third extracted organic mixture comprising diphenyl carbonate and said chloride compound; and removing said chloride analog from said third extracted organic mixture by extraction with water at a temperature in the range of about 20–100° C. to yield diphenyl carbonate of enhanced purity.

27. A method according to claim 26 wherein the aqueous solution of divalent palladium is treated with a reducing agent to reduce the divalent palladium to elemental palladium.

28. A method according to claim 27 wherein the reducing agent is formic acid or elemental hydrogen.

29. A method according to claim 27 wherein the elemental palladium is oxidized to divalent palladium.

30. A method according to claim 29 wherein the oxidation is by a mixture of nitric acid and acetic acid.

31. A method according to claim 30 wherein the divalent palladium is converted to a catalytically active species.

32. A method according to claim 26 wherein the divalent cobalt is converted to a catalytically active species.

33. An integrated method for removal of palladium, cobalt and bromide source comprising a tetraalkylammonium or hexaalkylguanidinium halide from a carbonylation reaction mixture comprising diphenyl carbonate, phenol and catalyst constituents including a palladium compound, a cobalt compound and said bromide source, which comprises:

removing combined cobalt and said bromide source from said carbonylation mixture by extraction with water at a temperature in the range of about 20–100° C. to form a first extracted organic mixture comprising diphenyl carbonate, phenol and palladium;

extracting said first extracted organic mixture with aqueous hydrochloric acid to remove elemental and combined palladium and form an aqueous solution of divalent palladium and a second extracted organic mixture comprising diphenyl carbonate and phenol; and stripping phenol from said second extracted organic mixture to yield diphenyl carbonate of enhanced purity.

34. A method according to claim 33 wherein the aqueous solution of divalent palladium is treated with a reducing agent to reduce the divalent palladium to elemental palladium.

35. A method according to claim 34 wherein the reducing agent is formic acid or elemental hydrogen.

36. A method according to claim 34 wherein the elemental palladium is oxidized to divalent palladium.

37. A method according to claim 36 wherein the oxidation is by a mixture of nitric acid and acetic acid.

38. A method according to claim 36 wherein the divalent palladium is converted to a catalytically active species.

39. A method according to claim 33 wherein the divalent cobalt is separated and converted to a catalytically active species.

* * * * *